United States Patent [19]
Jeddeloh

[11] Patent Number: 5,935,233
[45] Date of Patent: Aug. 10, 1999

[54] COMPUTER SYSTEM WITH A SWITCH INTERCONNECTOR FOR COMPUTER DEVICES

[75] Inventor: Joseph Jeddeloh, Minneapolis, Minn.

[73] Assignee: Micron Electronics, Inc., Nampa, Id.

[21] Appl. No.: 08/859,894

[22] Filed: May 21, 1997

[51] Int. Cl.[6] .................................................. G06F 13/38
[52] U.S. Cl. .......................................... 710/129; 710/128
[58] Field of Search ..................................... 395/309, 310, 395/311, 308, 306, 280, 312; 711/118, 146; 710/126, 128, 129, 130, 131, 132, 100

[56] References Cited

U.S. PATENT DOCUMENTS

| | | | |
|---|---|---|---|
| 4,875,154 | 10/1989 | Mitchell .................................. | 395/311 |
| 5,630,094 | 5/1997 | Hayek et al. ........................... | 395/473 |
| 5,761,444 | 6/1998 | Ajanovic et al. ....................... | 395/280 |
| 5,793,996 | 8/1998 | Childers et al. ........................ | 395/309 |

*Primary Examiner*—Glenn A. Auve
*Assistant Examiner*—Xuong Chung-Trans
*Attorney, Agent, or Firm*—Seed and Berry LLP

[57] ABSTRACT

A computer bridge interconnects a plurality of computer buses. The computer bridge includes first and second bus interfaces structured for coupling to first and second computer buses, respectively. The computer bridge also includes a control switch having a request phase selector and a data phase selector connected to each of the first and second bus interfaces. The request phase selector selectively connects a second bus interface to the first bus interface during a request phase of a transaction. The data phase selector selectively connects the second bus interface to the first bus interface during a data phase of the transaction, thereby decoupling the data phase from the request phase. The switch may include dedicated connections between two pairs of computer buses so that data can be transmitted simultaneously between the two pairs of computer buses. As such, a transaction can be transmitted to or from any computer bus that is not currently transmitting or receiving a transaction without waiting for any internal bus of the computer bridge to become available.

43 Claims, 6 Drawing Sheets

COMPUTER SYSTEM WITH A SWITCH INTERCONNECTOR FOR COMPUTER DEVICES

TECHNICAL FIELD

The present invention relates to processing transactions in a computer system, and more particularly, to efficiently interconnect computer devices.

BACKGROUND OF THE INVENTION

A computer system includes a set of interconnected components or modules of three basic types: central processing unit (CPU), memory, and input/output (I/O). The modules of the computer system typically are connected together by communication pathways known as buses. A bus is a shared transmission medium in that plural computer modules can transmit across the same bus. However, if two modules transmit during the same time period, their signals will overlap and become garbled. Therefore, it is important to ensure that only one module transmits across the bus during a given time period.

Shown in FIG. 1 is a prior art computer system 10 that includes a processor bus 12 coupled to a memory cache 14 and to a computer processor 16. The computer system 10 also includes a system memory 17 coupled to the processor bus 12 by a memory controller 18. Also coupled to the processor bus 12 by a PCI-host bridge 20 is a Peripheral Component Interconnect (PCI) bus 22. Coupled to the PCI bus 22 by a graphics controller 24 is a graphics monitor 26 that outputs information to a user. An Industry Standard Architecture (ISA) bus 28 also is coupled to the PCI bus 22 via a PCI-ISA bridge 30. Coupled to the ISA bus 28 are a hard drive 32 and an input device 34, such as a keyboard, mouse, or microphone, that inputs information to the computer system 10 from the user.

As computer devices have become more sophisticated and faster it has become more difficult for the computer buses, such as the processor bus 12, to keep up with the increased data flow presented by the computer devices. Whenever the processor 16 or the devices 22–36 coupled to the processor via the PCI-host bridge 20 requests access to the system memory 17, the request and accompanying data and control signals must be transmitted across the processor bus 12. As such, the performance of the entire computer system 10 can be limited by the speed of the processor bus 12, the PCI bus 22, and/or the ISA bus 28. Moreover, as the speed of computer devices continues to increase, the delays caused by sharing the resources of the processor bus 12 become more acute.

One reason for delay in computer buses, such as the processor bus 12, is that each computer bus includes one or more data lines that handle data being transmitted in both directions. For example, the processor bus 12 handles data being read from and written to the system memory 17. As a result, each time access to the system memory 17 switches from a read to a write or a write to a read, data must go completely through the processor bus 12 before data can be sent through the processor bus in the opposite direction. The time it takes to wait for the processor bus 12 to switch from one direction to the opposite direction is known as bus turn-around time and typically is at least one clock cycle of delay.

In addition to the increased speed of current computer devices, the computer buses must be able to handle the increase in the number of computer devices in current computer systems. For example, many current computer systems are provided with CD-ROM drives, local area network (LAN) connections, modems, plural microprocessors, etc. in addition to the standard computer devices shown in FIG. 1. Each computer device added to a computer system is another device that must share the same limited resources of each computer bus.

SUMMARY OF THE INVENTION

A first embodiment of the present invention is directed to a computer bridge for interconnecting at least four computer buses. The computer bridge includes first, second, third, and fourth bus interfaces structured for coupling to first, second, third, and fourth computer buses, respectively. The computer bridge includes a control switch coupled to each of the bus interfaces. The control switch includes a first pathway connecting the first bus interface to the second bus interface and a second pathway connecting the third bus interface to the fourth bus interface while the bus interfaces are connected by the first pathway. As such, a transaction can be transmitted to or from any computer bus that is not currently transmitting or receiving a transaction without waiting for any internal bus of the computer bridge to become available.

A second embodiment of the present invention is directed to a computer bridge for interconnecting a plurality of computer buses. The computer bridge includes first and second bus interfaces structured for coupling to first and second computer buses, respectively. The computer bridge includes a control switch coupled to each of the bus interfaces. The control switch includes a request phase selector and a data phase selector each connected to the first bus interface. The request phase selector selectively connects the second bus interface to the first bus interface during a request phase of a transaction. The data phase selector selectively connects the second device interface to the first device interface during a data phase of the transaction.

A third embodiment of the present invention is directed to a computer bridge for interconnecting at least three computer buses. The computer bridge includes a first, second, and third bus interfaces structured to be coupled to first, second, and third computer buses, respectively. The computer bridge also includes a control switch coupled to each of the device interfaces. The control switch selectively connects each of the first and second bus interfaces to the third bus interface.

DETAILED DESCRIPTION OF THE INVENTION

An embodiment of the present invention is directed to a computer system in which a switch selectively connects at least three computer buses with each other. Such a switch may include separate lines for read and write data so that no time is wasted waiting for a bus to change the direction in which the data can be transmitted. In addition, the switch may include dedicated connections between the various computer buses so that data can be transmitted simultaneously by a first computer bus to a second computer bus and from a third computer bus to a fourth computer bus. Moreover, such dedicated lines would enable transactions to be heavily pipelined such that transmission time on the dedicated lines is negligible. Further, the switch may include separate pathways for transaction requests and transaction data so that plural transaction requests can be queued before the data corresponding to the transaction requests are transmitted.

Figure 1:
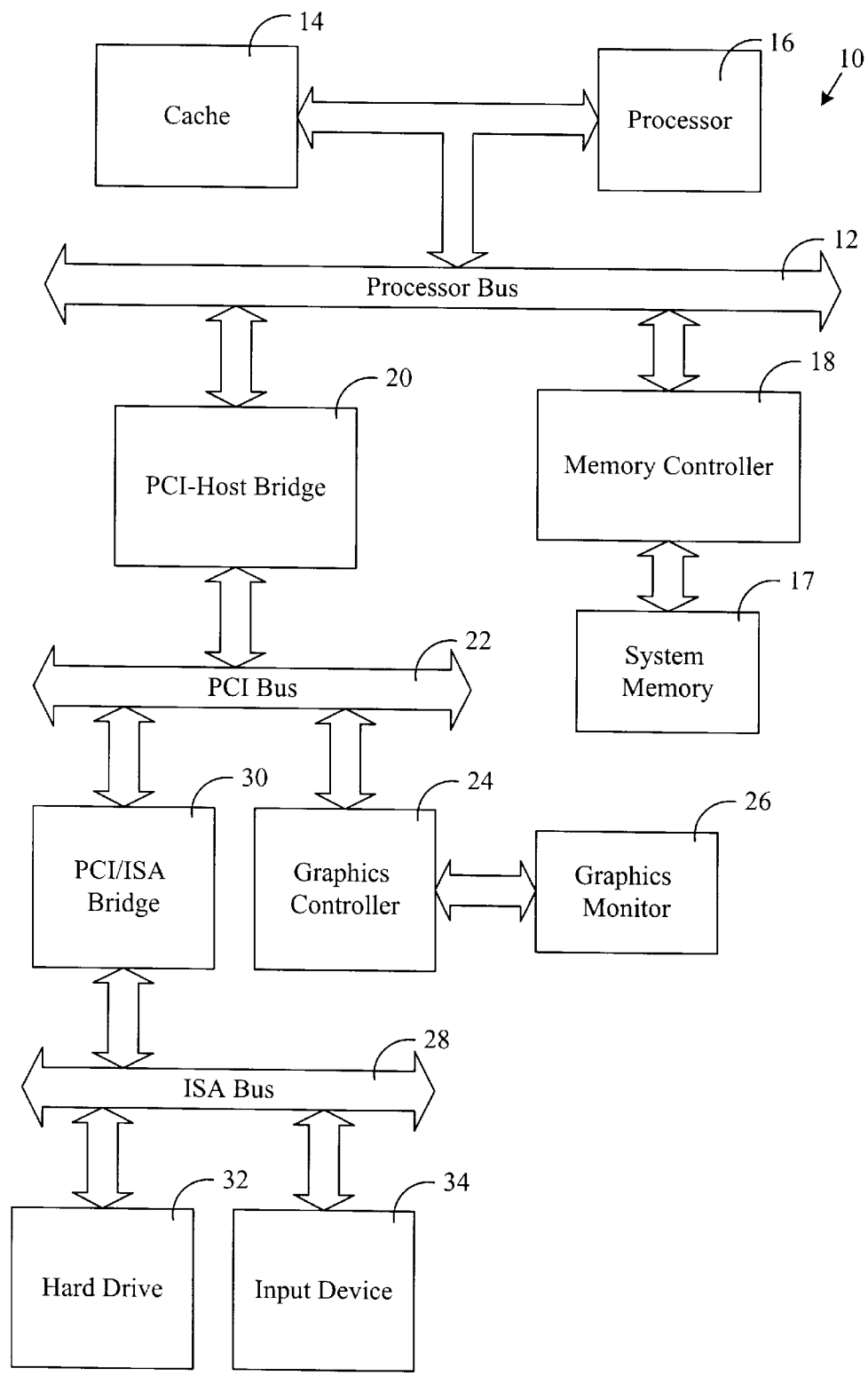
FIG. 1 is a block diagram of a prior art bus-based computer system.
Figure 2:
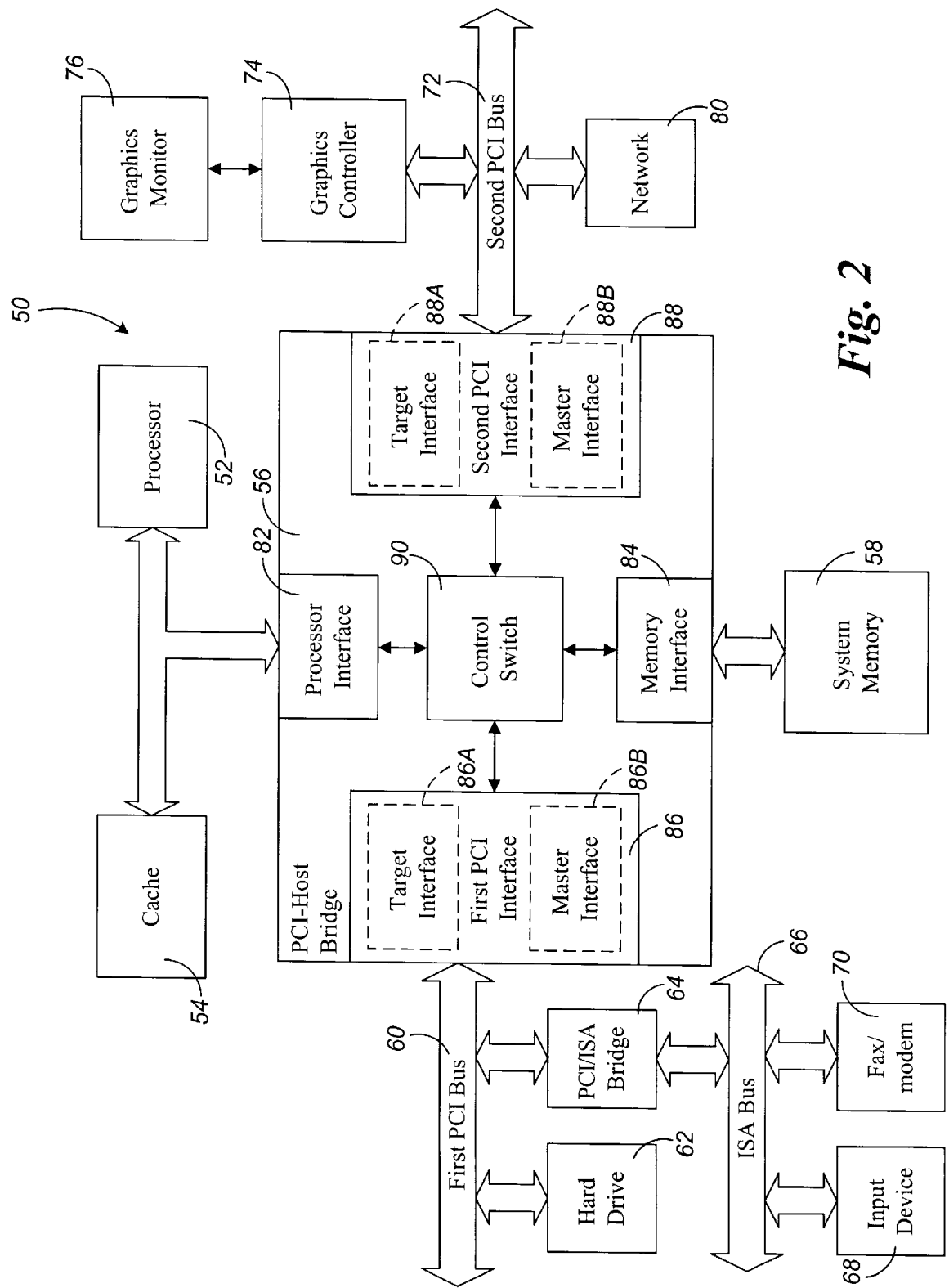
FIG. 2 is a block diagram of a switch-based computer system according to the present invention.

A computer system 50 for executing transaction requests according to an embodiment of the present invention is shown in FIG. 2. The computer system 50 includes a processor 52 coupled to a memory cache 54 and to a PCI-host bridge 56. The processor 52 can include any microprocessor, such as the Pentium Pro™ microprocessor from Intel Corp. The computer system 50 also includes a system memory 58 coupled to the PCI-host bridge 56 by a memory bus 59. The system memory 58 is generally comprised of dynamic random access memory (DRAM), which stores software instructions and data that is used by the processor 52 to perform a specified function. The software instructions include application programs and an operating system, such as Microsoft Windows NT™ that interfaces the application programs with the hardware of the computer system 50.

The PCI-host bridge 56 is coupled by a first expansion bus 60, such as a Peripheral Component Interconnect (PCI) bus, to a plurality of PCI computer devices, such as a hard drive 62 and a PCI-ISA bridge 64. The PCI-ISA bridge 64 couples the PCI bus 60 to an Industry Standard Architecture (ISA) bus 66. Coupled to the ISA bus 66 are a plurality of ISA computer devices, such as an input device 68 and a fax/modem 70. The input device 68 can include any of numerous known input devices, such as a keyboard, mouse, and electronic pen and tablet.

The PCI-host bridge 56 is coupled by a second expansion bus, such as a second PCI bus 72 to a graphics controller 74. The graphics controller 74 controls how graphics images are displayed on a graphics monitor 76 coupled to the graphics controller. Also coupled to the second PCI bus 72 is network 80 which can include a LAN or any other type of network. It will be appreciated that expansion buses other than PCI buses and ISA buses and other computer devices coupled to the expansion buses may be used.

The PCI-host bridge 56 provides an interface between the processor 52, system memory 58, first PCI bus 60, and second PCI bus 72. The PCI-host bridge 56 includes a processor interface 82 that controls how data is received from or sent to the processor 52 and the cache 54. The PCI-host bridge 56 also includes a memory interface 84 that controls how data is written to and read from the system memory 18. The PCI-host bridge 56 also includes first and second PCI interfaces 86, 88 that control how data is sent on the first and second PCI buses 60, 72, respectively. The first PCI interface 86 includes a first PCI target interface 86A that processes transactions received from the first PCI bus 60 and a first PCI master interface 86B that processes transactions being transmitted to the first PCI bus 60. Similarly, the second PCI interface 88 includes a second PCI target interface 88A that processes transactions received from the second PCI bus 72 and a second PCI master interface 88B that processes transactions being sent to the second PCI bus 72.

Each completed transaction transmitted via the control switch 90 between the interfaces 82–88 usually will include three phases: a request phase, a data phase, and a snoop phase. In the request phase, one of the interfaces 82–88 transmits a request for access to one of the other interfaces 82–88. In the data phase, data is passed between the interfaces 82–88 according to the transaction being requested in the request phase. In the snoop phase, the processor interface 82 determines whether the contents of the memory locations in the system memory 58 to which the transaction is directed are located in the memory cache 54. If so, then the transaction is executed using the memory cache 54 by writing data to or reading data from the memory cache 54.

In contrast to prior art computer systems, the PCI-host bridge 56 also includes a control switch 90 that couples the processor interface 82, memory interface 84, first PCI interface 86 and second PCI interface 88 to each other. In one embodiment, the control switch 90 includes separate lines and switches for each of the request, data, and snoop phases of each transaction transmitted between the interfaces 82–88. In addition, the embodiment may include connection lines dedicated to connect each of the interfaces 82–88 to each other. Such dedicated connection lines enable a first pair of the interfaces 82–88 to transmit transactions simultaneously with transactions transmitted by a second pair of interfaces 82–84. For example, the processor interface 82 may transmit a transaction to the first PCI interface 86 while the second PCI interface 88 transmits a transaction to the memory interface 84.

Figure 3:
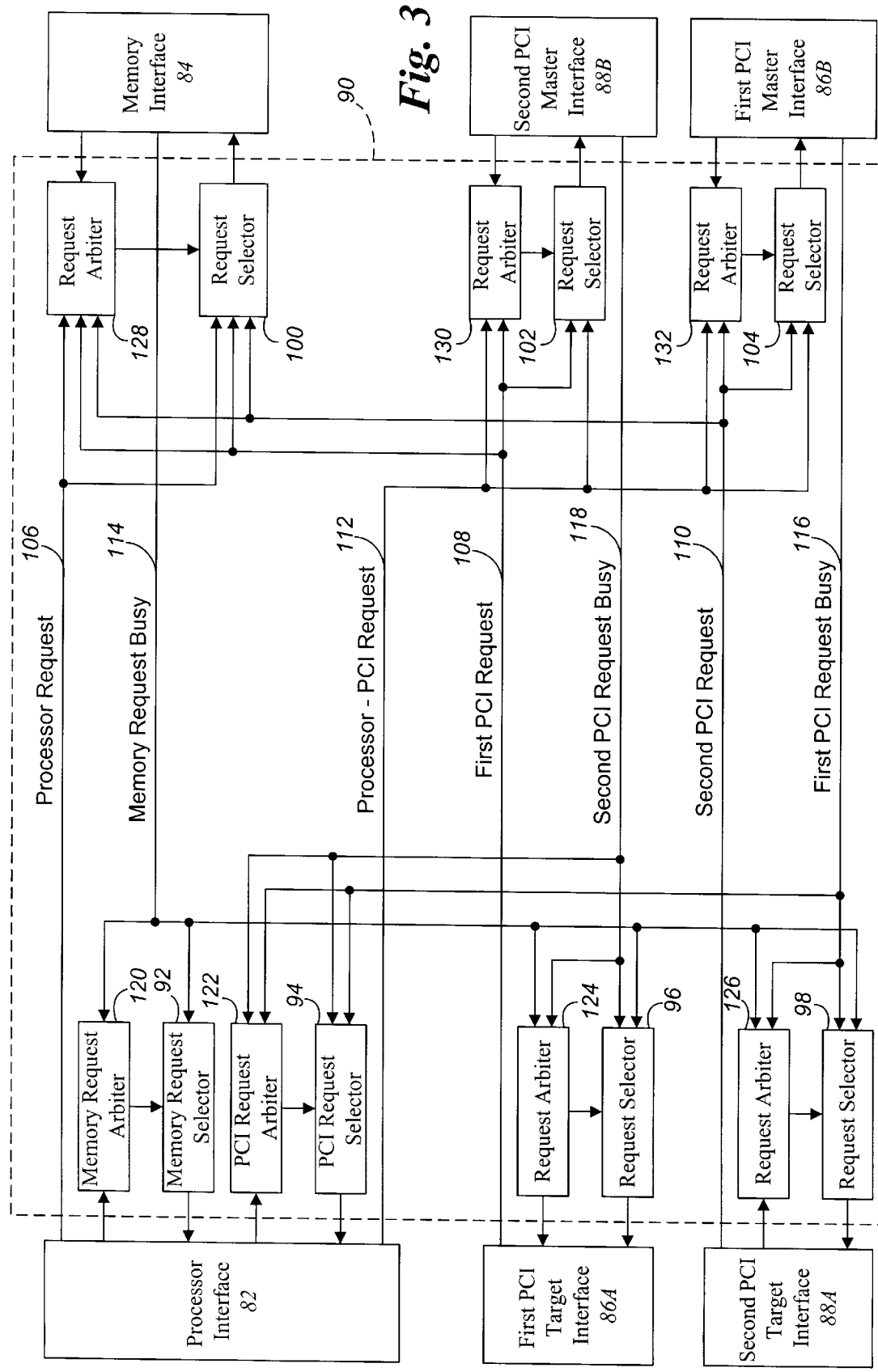
FIG. 3 is a block diagram of a transaction request portion of a bridge of the computer system shown in FIG. 2.

A block diagram of a portion of the PCI-host bridge 56 that performs the request phase of each transaction is shown in FIG. 3. FIG. 3 shows portions of the control switch 90 that implement the request phase of each transaction. The control switch 90 includes a set of request selectors 92, 94, 96, 98, 100, 102, 104 each dedicated to one of the interfaces 82–88. Each of the request selectors 92–104 is a switch that selectively connects one or more of the interfaces 82–88 to the interface to which the request selector is dedicated. Specifically, the processor interface 82 is associated with a memory request selector 92 that selectively connects the memory controller 84 to the processor interface 82 to enable transaction requests to be transmitted from the memory controller 84 to the processor interface 82. In addition, the processor interface 82 also is coupled to a PCI request selector 94 that selectively connects the first and second PCI master interfaces 86B, 88B to the processor interface 82 to enable transaction requests to be transmitted from the PCI master interfaces 86B, 88B to the processor interface 82. Each of the memory interface 84, first and second PCI target interfaces 86A, 88A, and first and second PCI master interfaces 86B, 88B is associated with a single one of the request selectors 96–104, although plural request selectors for each of the interfaces could be employed as is the case with the processor interface 82. Conversely, the processor interface 82 could be associated with a single request selector coupled to the memory controller 84 and first and second PCI master interfaces 86B, 88B rather than employing separate memory and PCI request selectors 92, 94.

The processor interface 82 and first and second PCI target interfaces 86A, 88A are coupled to the request selector 100 associated with the memory interface 84 by a processor request bus 106, first PCI request bus 108 and second PCI request bus 110, respectively, in order to transmit transaction requests to the memory interface 84. The first PCI request bus 108 is also shown as being coupled to the request selector 102 associated with the second PCI master interface 88B or a separate first PCI request bus could be employed.

Similarly, the second PCI request bus 110 can be coupled to the request selector 104 associated with the first PCI master interface 86B or a separate second PCI request bus could be employed. In addition, the processor interface 82 is coupled to the request selectors 102, 104 by a processor-PCI request bus 112 to enable the processor 82 to transmit transaction requests to the first and second PCI master interfaces 86B, 88B. Once again, a second processor-PCI request bus could be employed to connect the processor interface 82 to one of the request selectors 102, 104 rather than coupling the processor-PCI request bus 112 to both request selectors 102, 104.

To enable the memory interface 84 to respond to transaction requests from the processor interface 82 and the first and second PCI target interfaces 86A, 88A, the memory interface 84 is coupled to the memory request selector 92, request selector 96, and request selector 98, respectively, by a memory request busy line 114. Similarly, the first PCI master interface 86B is coupled to the PCI request selector 94 and the request selector 98 by a first PCI request busy line 116 to enable the first PCI master interface to respond to transaction requests from the processor interface 82 and the second PCI target interface 88A. In addition, the second PCI master interface 88B is coupled to the PCI request selector 94 and the request selector 96 by a second PCI request busy line 118 to enable the second PCI master interface 88B to respond to transaction requests from the processor interface 82 and the first PCI target interface 86A. It will be appreciated that the memory request busy line 114 and the first and second PCI request busy lines 116, 118 can include plural lines to enable each of the memory interface 84 and first and second PCI master interfaces 86B, 88B to be separately connected to the memory request switch 92, PCI request switch 94, request switch 96 and request switch 98 as desired.

Associated with each of the request selectors 92–104 is a respective one of a set of request arbiters 120, 122, 124, 126, 128, 130, 132 that control the switching of the respective request selectors 92–104. Each of the request arbiters 120–132 is coupled to the same buses/lines 106–118 as its associated request selector 92–104. Thus, each of the request arbiters 120–132 receives the same transaction requests or request responses as its associated request selector 92–104. The memory request arbiter 120 uses an enable signal to cause the memory request selector 92 to connect the memory interface 84 to the processor interface 82 unless the processor interface 82 indicates, via a busy signal, to the memory request arbiter 120 that the processor interface 82 is too busy to receive a transmission from the memory interface 84. Each of the request arbiters 122–132 employs a conventional arbitration scheme to determine which of plural interfaces the request selector associated with the request arbiter should connect to the interface associated with the request arbiter.

For example, if the processor 52, fax modem 70, and graphics controller 72 each submit transaction requests for access to the system memory 58, then the processor interface 82 and the first and second PCI target interfaces 86A, 88A will receive and forward the respective transaction requests to the request selector 100 and request arbiter 128 associated with the memory interface 84. Based on its internal arbitration scheme, the request arbiter 128 will select one of the transaction requests and transmit to the request selector 100 a signal indicating which of the transaction requests was selected. The signal from the request arbiter 128 causes the request selector 100 to connect to the memory interface 84 the bus from the interface that transmitted the selected transaction request. For example, if the request arbiter 128 selected the transaction request from the processor interface 82, then the request switch 100 will connect the processor request bus 106 to the memory interface 84 to allow the memory interface 84 to receive the selected transaction request. If the memory interface 84 is not ready to receive the transaction request, then the memory interface 84 will transmit a memory request busy signal on the memory request busy line 114. The memory request busy signal will indicate to whichever one of the interfaces 82, 86A, 88A that transmitted the selected transaction request that the transaction request was not accepted and should be retransmitted to the request selector 100 and request arbiter 128. In addition, the memory interface 84 transmits to the request arbiter 128 a busy signal indicating that the request arbiter 128 should not select additional transaction requests until the busy signal is removed.

If the memory interface 84 is ready to accept the selected transaction request, then the memory interface 84 captures the relevant information from the transaction request. Also, the memory interface 84 transmits a memory request not-busy signal on the line 114 to the interface that transmitted the selected transaction request. The memory request not-busy signal allows the interface that transmitted the selected transaction request to transmit a new transaction request to the request selector 100 and request arbiter 128 if a new transaction request is available. After capturing the selected transaction request, the memory interface can execute the transaction requested by reading data from or writing data to the system memory 58 depending on the type of transaction requested. A similar process occurs with transaction requests transmitted to the first and second PCI master interfaces 86B, 88B.

Figure 4:
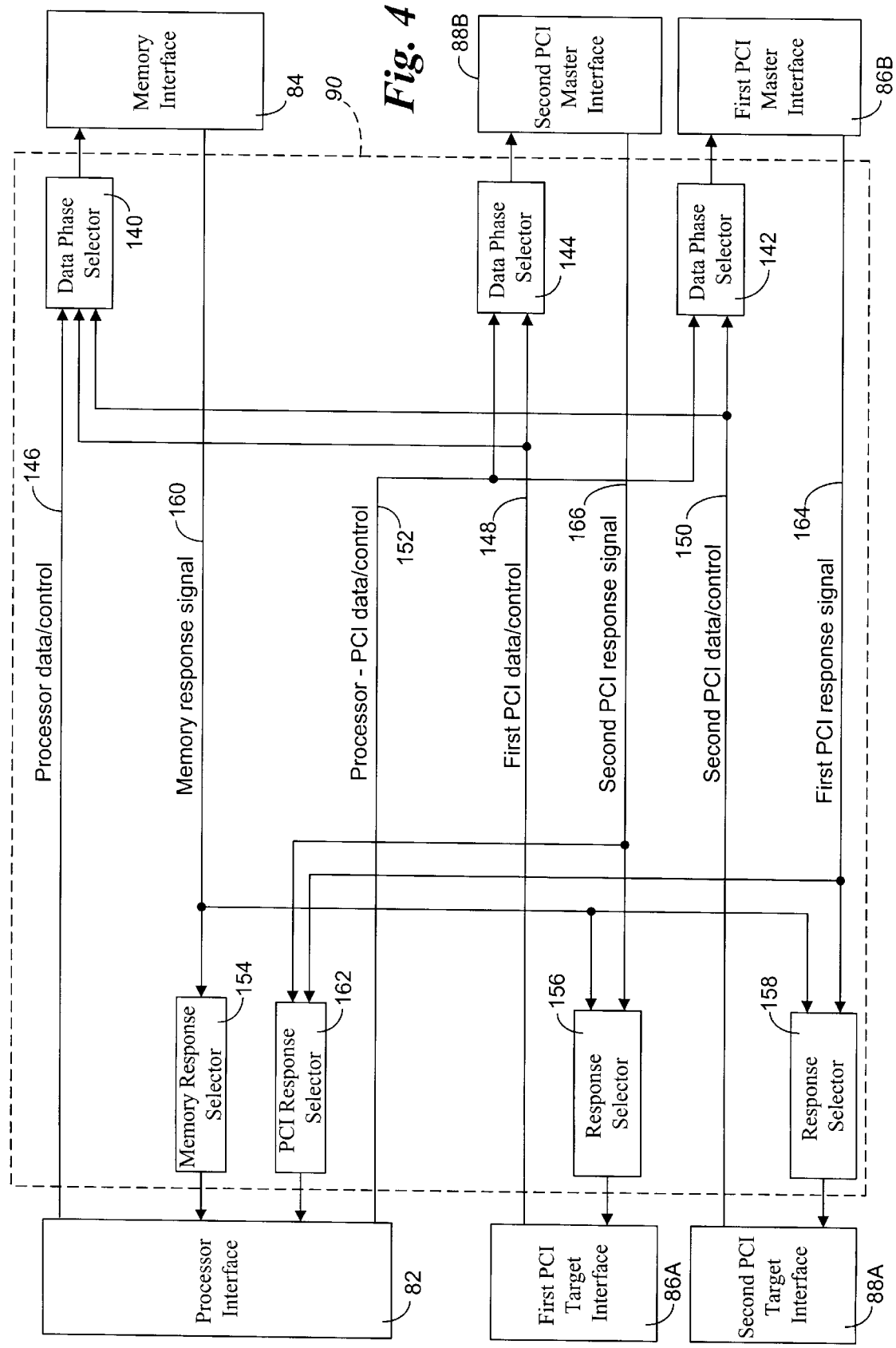
FIG. 4 is a block diagram of a data portion of the bridge of the computer system shown in FIG. 2.

A block diagram of a portion of the PCI-host bridge 56 that performs the data phase of each transaction is shown in FIG. 4. As discussed above, the data phase of each transaction involves transmitting data between appropriate interfaces 82–88 according to the corresponding transaction request processed by the request phase portion of the PCI-host bridge 56 shown in FIG. 3. The control switch 90 includes data phase selectors 140, 142, 144 associated with the memory interface 84, first PCI master interface 86B, and second PCI master interface 88B, respectively. Each of the data phase selectors 140–144 is a switch that selectively connects two or more of the processor interface 82 and PCI target interfaces 86A, 88A to the one of the memory interface 84 and PCI master interfaces 86B, 88B that is associated with the data phase selector. Each of the data phase selectors 140–144 is controlled by the signals presented to the data phase selector on a first-come-first-served basis. That is, each of the data phase selectors 140–144 connects to the interface associated with the data phase selector whichever one of the processor interface 82 and PCI target interfaces 86A, 88A first transmits a signal to the data phase selector.

The processor interface 82, first PCI target interface 86A, and second PCI target interface 88A are coupled to the data phase selector 140 by processor data/control bus 146, first PCI data/control bus 148, and second PCI data/control bus 150, respectively, to enable data phase data and control signals to be transmitted to the memory interface 84 via the data phase selector 140. The processor interface 82 is coupled to the data phase selectors 142, 144 by a processor-PCI data/control bus 152. The first PCI data/control bus 148 also couples the first PCI target interface 86A to the data phase selector 144 associated with the second PCI master interface 88B. Similarly, the second PCI data/control bus 150 couples the second PCI target interface 88A to the data phase selector 142 associated with the first PCI master interface 86B. It will be appreciated that each of the first and second PCI data/control buses 148–150 can include plural buses so that the first and second PCI target interfaces 86A, 88A can be coupled to the data phase selector 140 separately from the data phase selectors 142–144. Similarly, the processor-PCI data/control bus 152 could include two buses to enable the processor interface 82 to be coupled separately to each of the data phase selectors 142, 144.

In contrast to prior art computer systems, the control switch 90 enables the data phase of a transaction to be decoupled from the request phase of the same transaction. As such, several transaction requests can be queued during the request phases of the transaction before the corresponding data are transmitted during the data phases of the transactions. To facilitate such phase decoupling, the transaction request and write data of each write transaction can be accompanied by a destination tag that indicates which of the processor interface 82 and first and second PCI target interfaces 86A, 88A transmitted the write transaction. For read transactions, the destination tag can be transmitted with the transaction request portion of the read transactions. Each of the data phase selectors 140–142 can select the write data of write transactions regardless of the order in which the corresponding request selectors 100–104 selected the transaction requests corresponding to the write data. The memory interface 84 and first and second PCI master interfaces 86B, 88B can use the destination tags to ensure that they process the write data in the same order that the corresponding transaction requests were received. Each of the memory interface 84 and first and second PCI master interfaces 86B, 88B may implement a transaction queue that uses the destination tags to associate the write data received in the data phase with the appropriate transaction request received in the request phase.

Associated with the processor interface 82, first PCI target interface 86A, and second PCI target interface 88A are memory response selector 154 and first and second PCI response selectors 156, 158, respectively, coupled to the memory interface 84 by a memory response signal bus 160. Also associated with the processor interface 82 is a PCI response selector 162 that is coupled by a first PCI response signal bus 164 and a second PCI response signal bus 166 to first and second PCI master interfaces 86B, 88B, respectively. Each of the response selectors 154–158, 162 is a switch that selectively connects one or more of the memory interface 84 and PCI master interfaces 86B, 88B to the one of the processor interface 82 and PCI target interfaces 86A, 88A that is associated with the response selector. Each of the response selectors 154–158, 162 is controlled by the signals presented to the response selector on a first-come-first-served basis. The response selectors 156, 158 are coupled to the second and first PCI master interfaces 88B, 86B by the second and first PCI response signal buses 166, 164, respectively. It will be appreciated that each of the response signal buses 160, 164, 166 can include plural buses so that none of the response signal buses are shared by two or more of the response selectors 154–158, 162.

The data/signals that are transmitted on the response signal buses 160, 164, 166 depend on whether the transactions are read or write transactions. If the transaction is a write transaction, then the data/signals include a signal indicating whether the write data was successfully transmitted and a response tag that identifies which of the processor interface 82 and first and second target interfaces 86A, 88A transmitted the write transaction request. If the transaction is a read transaction, then the data/signals sent include the read data and the appropriate response tag. Upon receiving the response tag at one of the response selectors 154–158, 162, the response selector connects the response signal bus from which the response tag was received to the interface associated with the response selector. The response tag enables the processor interface 82 and first and second PCI target interfaces 86A 88A keep track of which transaction request is being responded to. The processor interface 82 and PCI target interfaces 86A, 88A then can forward the read data or write complete signal to the computer device that initiated the transaction.

Figure 5:
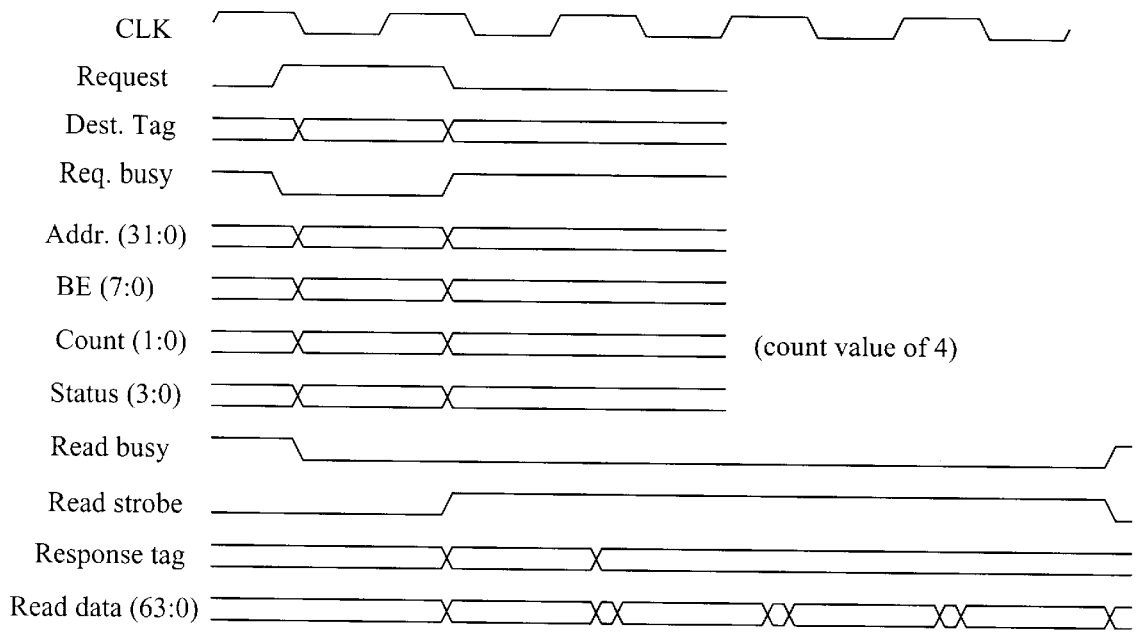
FIG. 5 is a timing diagram of a read transaction implemented by the computer system shown in FIG. 2.
Figure 6:
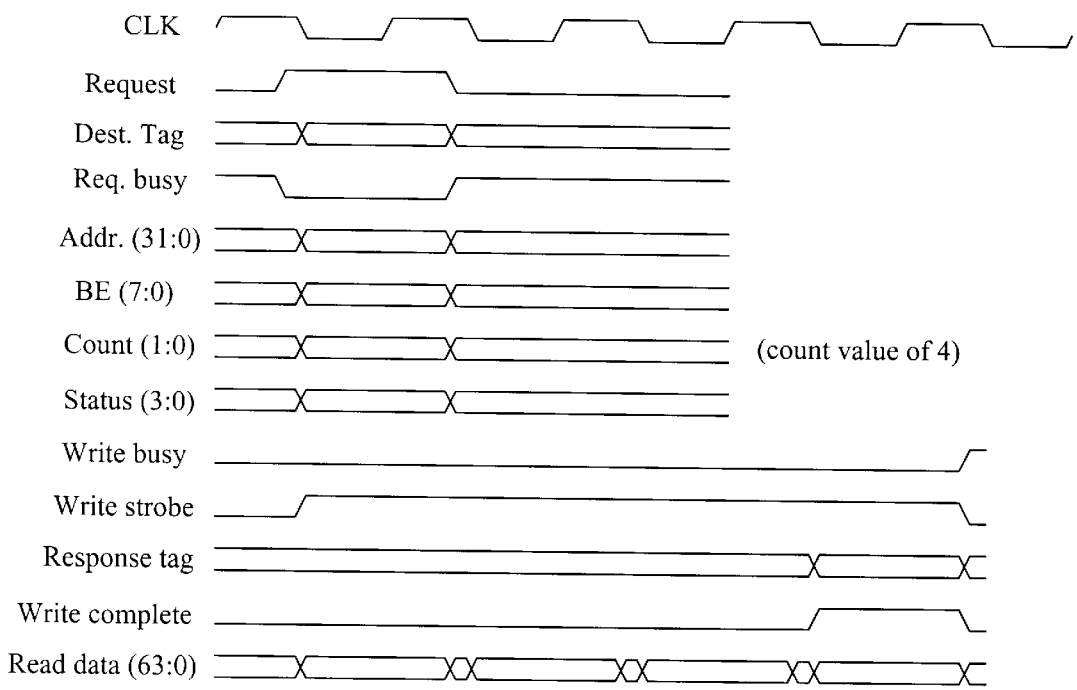
FIG. 6 is a timing diagram of a write transaction implemented by the computer system shown in FIG. 2.

A better understanding of the execution of transactions can be obtained from the timing diagrams of a read transaction in FIG. 5 and a write transaction in FIG. 6. Assume for simplicity that the read and write transactions shown in FIGS. 5 and 6 are requests from the processor 52 to the system memory 58 (FIG. 2). The timing diagrams shown in FIGS. 5 and 6 show the data/signals being transmitted within the PCI-host bridge 56.

In FIG. 5 the processor interface 82 asserts a transaction request signal on the processor request bus 106 to the request switch 100 and request arbiter 128 associated with the memory interface 84. The transaction request transmitted on the processor request bus 106 also includes a destination tag identifying the processor 52, an address identifying the portion of the system memory 58 to be read, a byte enable value indicating bytes to be read, a count value indicating the number of requested data transfers, and a status value indicating whether a read or a write is being requested. The request arbiter 128 causes the request selector 100 to connect the processor request bus 106 to the memory interface 84 to enable the memory interface to except the transaction request. If the memory interface 84 is ready to receive the transaction request, then the memory interface latches the transaction request and deasserts a request busy signal on the memory request busy line 114. If the memory interface 84 were too busy to latch the transaction request, then the memory interface 84 would have left the request busy signal asserted on the memory request busy line 114 to indicate to the processor interface 84 that the transaction request will have to be resubmitted.

Concurrently with the transmission of the transaction request signals, the processor interface 82 deasserts a read busy signal on the processor data/control bus 146 to indicate that the processor interface 82 is ready to receive the data being requested by the read transaction. The memory interface 84 reads the requested portions of the system memory 58 and returns the data on the memory response signal bus 160 to the processor interface 82 via the memory response selector 154. The memory interface 84 also transmits on the memory response signal bus 160, the response tag indicating that the data being transmitted was requested by the processor 56. It will be appreciated that the destination and response tags are not strictly necessary with respect to transactions between the processor interface 82 and the memory interface 84 because all transactions controlled by the processor interface 82 are transmitted from the processor 52. However, such destination and response tags are more useful when a transaction is between devices on the first and second PCI buses 60, 72 so that the data being read can be returned to the correct requesting device.

In the write transaction illustrated by the timing diagram shown in FIG. 6, the processor interface 82 transmits the transaction request on the processor request line 106 to the memory interface 84 via the request selector 100 and request arbiter 128. The write transaction request can be identical to the read transaction request shown in FIG. 5 except that the status value will indicate that the transaction request is a write transaction request rather than a read transaction request. As with the read transaction shown in FIG. 5, the memory interface 84 will deassert the request busy signal on the memory request busy line 114 if the memory interface 84 is ready to receive and latch the transaction request and will leave the request busy line asserted otherwise.

Concurrently with the transaction request transmitted on the processor request line 120 (FIG. 3), the processor interface 82 asserts a write strobe signal on the processor data/control bus 146 to initiate the data phase of the transaction. Also, the processor interface 82 re-transmits the destination tag so that the memory interface 84 can match the data being written with the appropriate transaction request. In addition, the processor interface 82 transmits four 64-bit data words as indicated by the count value of four transmitted in the write transaction request. As the fourth data word is being received, the memory interface 84 transmits a write complete signal indicating that the transaction is being completed. The memory interface 84 also transmits the appropriate response tag indicating that the transaction being completed is the one that was transmitted by the processor 56. After receiving the fourth data word, the memory interface 84 asserts a write busy signal to indicate that the memory interface is not ready to receive more data.

Figure 7:
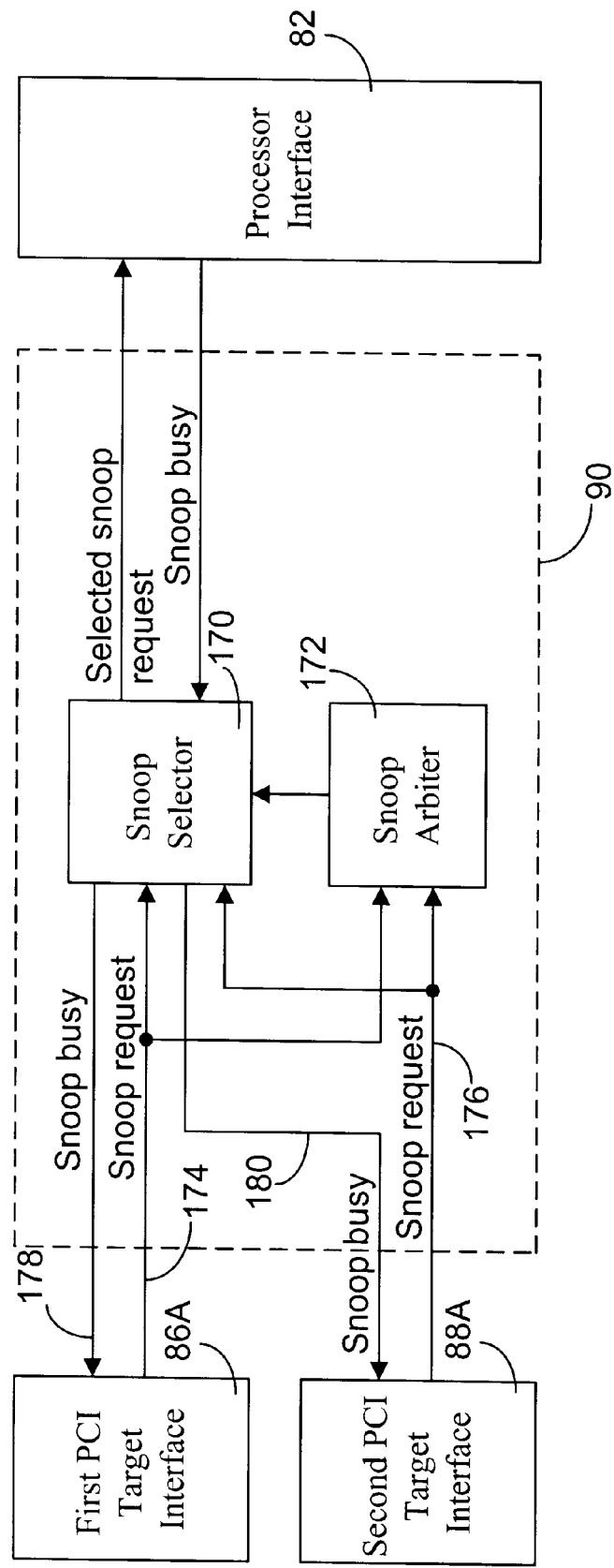
FIG. 7 is a block diagram of a snoop portion of the bridge of the computer system shown in FIG. 2.

A block diagram of a snoop phase portion of the PCI-host bridge 56 that performs the snoop phase of each transaction is shown in FIG. 7. The control switch 90 enables the snoop phase to be implemented concurrently with the request and data phases. The control switch 90 includes a snoop selector 170 and a snoop arbiter 172 connected by first and second snoop request buses 174, 176 to the first and second PCI target interfaces 86A, 88A, respectively. In response to receiving snoop requests on the snoop request buses 174, 176, the snoop arbiter 172 selects one of the snoop requests and causes the snoop selector 170 to connect the selected snoop request line 174, 176 to the processor interface 82. If the processor interface 82 is too busy to accept the snoop request, then the processor interface transmits the snoop busy signal to the snoop selector 170. In response to receiving the snoop busy signal, the snoop selector 170 prevents further snoop requests from being selected and forwards the snoop busy signal on a first PCI snoop busy line 178 or a second PCI snoop busy line 180 to whichever one of the PCI target interfaces 86A, 88A transmitted the selected snoop request.

If the processor interface 82 is not too busy, then it captures the selected snoop request and snoops the cache 54 to determine whether the cache 54 is storing data for the portion of the system memory 58 being requested in the transaction request corresponding to the selected snoop request. If the cache 54 is not storing data for the portion of the system memory 58 being requested in the transaction request, then the transaction request proceeds as described in FIGS. 3 and 4. If the cache is storing data related to the portion of system memory 58 being requested by the transaction request, then the processor 52 causes the data to be written from the cache 54 to the system memory 58 via the processor and memory interfaces 82, 84 of the PCI-host bridge 56. In such a situation, the processor interface 82 signals to whichever one of the PCI target interfaces 86A, 88A transmitted the selected snoop request at the requested portion of the system memory 58 can now be accessed.

Based on the foregoing discussion it will be appreciated that the embodiments of the present invention described herein provide a highly efficient control switch that interconnects computer devices in a computer system. Unlike prior art computer systems that rely on a processor bus for access to the system memory, the control switch provides direct connections to the system memory for plural computer devices. In addition, the control switch maximizes the speed of transactions by decoupling the request and data phases of the transactions so that the transaction requests can be pipelined and transmission time can be minimized.

It should be understood that even though numerous advantages of the present invention have been set forth in the foregoing description, the above disclosure is illustrative only. Changes may be made in detail and yet remain within the broad principles of the present invention.

I claim:

1. A computer bridge for interconnecting at least three computer buses, comprising:

first, second, and third bus interfaces structured for coupling to first, second, and third computer buses, respectively; and a control switch coupled to each of the bus interfaces, the control switch being structured to selectively connect each of the first and second bus interfaces to the third bus interface, the control switch including a request phase selector and a data phase selector each connected to the third bus interface, the request phase selector being structured to selectively connect each of the first and second bus interfaces to the third bus interface during request phases of transactions and the data phase selector being structured to selectively connect each of the first and second bus interfaces to the third bus interface during data phases of the transactions.

2. The computer bridge of claim 1 wherein the control switch further includes a request arbiter connected to the request phase selector and to the first and second bus interfaces, the request arbiter being structured to arbitrate between transaction requests received from the first and second bus interfaces and cause the request phase selector to connect to the third bus interface whichever one of the first and second bus interfaces transmitted a transaction request that is selected by the request arbiter.

3. The computer bridge of claim 1 wherein the control switch is structured to selectively connect the first bus interface to the second bus interface.

4. A computer bridge for interconnecting at least three computer buses, comprising:

first, second, third, and fourth bus interfaces structured for coupling to first, second, third, and fourth computer buses, respectively; and a control switch coupled to each of the bus interfaces, the control switch being structured to selectively connect each of the first and second bus interfaces to the third bus interface, the control switch being structured to connect the first bus interface to the second bus interface while simultaneously connecting the third bus interface to the fourth bus interface.

5. The computer bridge of claim 4 wherein the control switch includes read and write pathways connecting the first bus interface to the third bus interface, the read pathway being structured to enable read data to be transmitted from the third bus interface to the first bus interface and the write pathway being separate from the read pathway and structured to enable write data to be transmitted from the first bus interface to the third bus interface.

6. The computer bridge of claim 4 wherein the control switch includes first, second, and third selectors connected to the first, second, and third bus interfaces, respectively, the first selector selectively connecting the second and third bus interfaces to the first bus interface, the second selector selectively connecting the first and third bus interfaces to the second bus interface, and the third selector selectively connecting the first and second bus interfaces to the third bus interface.

7. The computer bridge of claim 4 wherein the first bus interface includes a target bus interface and a master bus interface, the target bus interface being structured to process transaction requests received from the first computer bus and the master bus interface being structured to process transaction requests directed to the first computer bus.

8. A computer bridge for interconnecting at least three computer buses, comprising:

first, second, and third bus interfaces structured for coupling to first, second, and third computer buses, respectively;

a memory cache to which the third bus interface is connected; and a control switch coupled to each of the bus interfaces, the control switch being structured to selectively connect each of the first and second bus interfaces to the third bus interface, the control switch including a snoop selector and a snoop arbiter each connected to the first and second bus interfaces, the snoop arbiter being structured to arbitrate between snoop requests received from the first and second bus interfaces and cause the snoop selector to connect to the third bus interface whichever one of the first and second bus interfaces transmitted a snoop request that is selected by the snoop arbiter, the third bus interface snooping the cache based on the selected snoop request.

9. A computer bridge for interconnecting a plurality of computer buses, comprising:

first and second bus interfaces structured for coupling to first and second computer buses, respectively; and a control switch coupled to each of the bus interfaces, the control switch including a first request phase selector and a first data phase selector each connected to the first bus interface, the first request phase selector being structured to selectively connect the second bus interface to the first bus interface during a request phase of a first transaction and the first data phase selector being structured to selectively connect the second bus interface to the first bus interface during a data phase of the first transaction, the control switch further including a request arbiter connected to the first request phase selector and to the second bus interface, the request arbiter being structured to determine whether the first bus interface is too busy to accept a transaction request from the second bus interface and cause the first request phase selector to connect the second bus interface to the first bus interface if the first bus interface is not too busy.

10. The computer bridge of claim 9 wherein the control switch includes a second request phase selector and a second data phase selector each connected to the second bus interface, the second request phase selector being structured to selectively connect the first bus interface to the second bus interface during a request phase of a second transaction and the data phase selector being structured to selectively connect the first bus interface to the second bus interface during a data phase of the second transaction.

11. The computer bridge of claim 9, further including a third bus interface coupled to a third computer bus wherein the control switch is structured to selectively connect the first and second bus interfaces to the third bus interface.

12. A computer bridge for interconnecting a plurality of computer buses, comprising:

first, second, third, and fourth bus interfaces structured for coupling to first, second, third, and fourth computer buses, respectively; and a control switch coupled to each of the bus interfaces, the control switch including a first request phase selector and a first data phase selector each connected to the first bus interface, the first request phase selector being structured to selectively connect the second bus interface to the first bus interface during a request phase of a first transaction and the first data phase selector being structured to selectively connect the second bus interface to the first bus interface during a data phase of the first transaction, the control switch being structured to connect the first bus interface to the second bus interface while simultaneously connecting the third bus interface to the fourth bus interface.

13. The computer bridge of claim 12 wherein the control switch includes read and write pathways connecting the first bus interface to the second bus interface, the read pathway being structured to enable read data to be transmitted from the first bus interface to the second bus interface and the write pathway being separate from the read pathway and structured to enable write data to be transmitted from the second bus interface to the first bus interface.

14. The computer bridge of claim 12 wherein the second bus interface includes a target bus interface and a master bus interface, the target bus interface being structured to process transaction requests received from the second computer bus and the master bus interface being structured to process transaction requests directed to the second computer bus.

15. A computer bridge for interconnecting a plurality of computer buses, comprising:

first, second, and third bus interfaces structured for coupling to first, second, and third computer buses, respectively, the third bus interface being coupled to a memory cache; and a control switch coupled to each of the bus interfaces, the control switch including a first request phase selector and a first data phase selector each connected to the first bus interface, the first request phase selector being structured to selectively connect the second bus interface to the first bus interface during a request phase of a first transaction and the first data phase selector being structured to selectively connect the second bus interface to the first bus interface during a data phase of the first transaction, the control switch including a snoop selector and a snoop arbiter each connected to the first and second bus interfaces, the snoop arbiter being structured to arbitrate between snoop requests received from the first and second bus interfaces and cause the snoop selector to connect to the third bus interface whichever one of the first and second bus interfaces transmitted a snoop request that is selected by the snoop arbiter, the third bus interface snooping the cache based on the selected snoop request.

16. A computer bridge for interconnecting at least four computer buses, comprising:

first, second, third, and fourth bus interfaces structured for coupling to first, second, third, and fourth computer buses, respectively; and a control switch coupled to each of the bus interfaces, the control switch including a first pathway connecting the first bus interface to the second bus interface and a second pathway connecting the third bus interface to the fourth bus interface while the first bus interface is connected to the second bus interface by the first pathway, the control switch further comprising:
- a first request phase selector structured to selectively connect the first bus interface to the second bus interface during a request phase of a first transaction;
- a first data phase selector structured to selectively connect the first bus interface to the second bus interface during a data phase of the first transaction;
- a second request phase selector structured to selectively connect the third bus interface to the fourth bus interface during a request phase of a second transaction; and
- a second data phase selector structured to selectively connect the third bus interface to the fourth bus interface during a data phase of the second transaction.

17. A computer bridge for interconnecting at least four computer buses, comprising:
- first, second, third, and fourth bus interfaces structured for coupling to first, second, third, and fourth computer buses, respectively; and
- a control switch coupled to each of the bus interfaces, the control switch including a first pathway connecting the first bus interface to the second bus interface and a second pathway connecting the third bus interface to the fourth bus interface while the first bus interface is connected to the second bus interface by the first pathway, the control switch further comprising:
  - a first request arbiter connected to the first request phase selector and to the first and third bus interfaces, the request arbiter being structured to arbitrate between transaction requests received from the first and third bus interfaces and cause the first request phase selector to connect to the second bus interface whichever one of the first and third bus interfaces transmitted a transaction request that is selected by the first request arbiter; and
  - a second request arbiter connected to the second request phase selector and to the first and third bus interfaces, the request arbiter being structured to arbitrate between transaction requests received from the first and third bus interfaces and cause the second request phase selector to connect to the fourth bus interface whichever one of the first and third bus interfaces transmitted a transaction request that is selected by the second request arbiter.

18. The computer bridge of claim 17 wherein the control switch further includes first and second selectors connected to the second and fourth bus interfaces, respectively, the first selector being structured to selectively connect the first and third bus interfaces to the second bus interface and the second selector being structured to selectively connect the first and third bus interfaces to the fourth bus interface.

19. The computer bridge of claim 18 wherein the control switch further includes third and fourth selectors connected to the first and third bus interfaces, respectively, the third selector being structured to selectively connect the second and fourth bus interfaces to the first bus interface and the fourth selector being structured to selectively connect the second and fourth bus interfaces to the third bus interface.

20. The computer bridge of claim 17 wherein the first pathway of the control switch includes read and write pathways connecting the first bus interface to the second bus interface, the read pathway being structured to enable read data to be transmitted from the second bus interface to the first bus interface and the write pathway being separate from the read pathway and structured to enable write data to be transmitted from the first bus interface to the second bus interface.

21. The computer bridge of claim 17 wherein the first bus interface includes a target bus interface and a master bus interface, the target bus interface being structured to process transaction requests received from the first computer bus and the master bus interface being structured to process transaction requests directed to the first computer bus.

22. A computer bridge for interconnecting at least four computer buses, comprising:
- first, second, third, and fourth bus interfaces structured for coupling to first, second, third, and fourth computer buses, respectively, the second bus interface being connected to a cache; and
- a control switch coupled to each of the bus interfaces, the control switch including a first pathway connecting the first bus interface to the second bus interface and a second pathway connecting the third bus interface to the fourth bus interface while the first bus interface is connected to the second bus interface by the first pathway, the control switch including a snoop selector and a snoop arbiter each connected to the first and third bus interfaces, the snoop arbiter being structured to arbitrate between snoop requests received from the first and third bus interfaces and cause the snoop selector to connect to the second bus interface whichever one of the first and third bus interfaces transmitted a snoop request that is selected by the snoop arbiter, the second bus interface snooping the cache based on the selected snoop request.

23. The computer bridge of claim 22 wherein the first bus interface is a processor interface coupled to a processor bus, the second bus interface is a first expansion bus interface coupled to a first expansion bus, the third bus interface is a second expansion bus interface coupled to a second expansion bus, and the fourth bus interface is a memory interface coupled to a system memory bus.

24. A computer system, comprising:
- first, second, and third computer buses for implementing computer transactions;
- first, second, and third bus interfaces coupled to the first, second, and third computer buses, respectively; and
- a control switch coupled to each of the bus interfaces, the control switch being structured to selectively connect each of the first and second bus interfaces to the third bus interface, the control switch further including a request arbiter connected to the request phase selector and to the first and second bus interfaces, the request arbiter being structured to arbitrate between transaction requests received from the first and second bus interfaces and cause the request phase selector to connect to the third bus interface whichever one of the first and second bus interfaces transmitted a transaction request that is selected by the request arbiter.

25. A computer system, comprising:
- first, second, third, and fourth computer buses for implementing computer transactions;
- first, second, third, and fourth bus interfaces coupled to the first, second, third, and fourth computer buses, respectively; and
- a control switch coupled to each of the bus interfaces, the control switch being structured to selectively connect each of the first and second bus interfaces to the third bus interface, the control switch being structured to connect the first bus interface to the second bus interface while simultaneously connecting the first bus interface to the third bus interface.

26. The computer system of claim 25 wherein the first computer bus is a processor bus, the second computer bus is an expansion bus, and the third computer bus is a system memory bus.

27. The computer system of claim 25 wherein the control switch includes read and write pathways connecting the first bus interface to the third bus interface, the read pathway being structured to enable read data to be transmitted from the third bus interface to the first bus interface and the write pathway being separate from the read pathway and structured to enable write data to be transmitted from the first bus interface to the third bus interface.

28. The computer system of claim 25 wherein the control switch includes first, second, and third selectors connected to the first, second, and third bus interfaces, respectively, the first selector selectively connecting the second and third bus interfaces to the first bus interface, the second selector selectively connecting the first and third bus interfaces to the second bus interface, and the third selector selectively connecting the first and second bus interfaces to the third bus interface.

29. The computer system of claim 27 wherein the first bus interface includes a target bus interface and a master bus interface, the target bus interface being structured to process transaction requests received from the first computer bus and the master bus interface being structured to process transaction requests directed to the first computer bus.

30. A computer system, comprising:

first, second, and third computer buses for implementing computer transactions;

first, second, and third bus interfaces coupled to the first, second, and third computer buses, respectively, the third bus interface being connected to a cache; and a control switch coupled to each of the bus interfaces, the control switch being structured to selectively connect each of the first and second bus interfaces to the third bus interface, the control switch including a snoop selector and a snoop arbiter each connected to the first and second bus interfaces, the snoop arbiter being structured to arbitrate between snoop requests received from the first and second bus interfaces and cause the snoop selector to connect to the third bus interface whichever one of the first and second bus interfaces transmitted a snoop request that is selected by the snoop arbiter, the third bus interface snooping the cache based on the selected snoop request.

31. A computer system, comprising:

first and second computer buses for implementing computer transactions;

first and second bus interfaces coupled to the first and second computer buses, respectively; and a control switch coupled to each of the bus interfaces, the control switch including a first request phase selector and a first data phase selector each connected to the first bus interface, the first request phase selector being structured to selectively connect the second bus interface to the first bus interface during a request phase of a first transaction and the first data phase selector being structured to selectively connect the second bus interface to the first bus interface during a data phase of the first transaction, the control switch including a second request phase selector and a second data phase selector each connected to the second bus interface, the second request phase selector being structured to selectively connect the first bus interface to the second bus interface during a request phase of a second transaction and the data phase selector being structured to selectively connect the first bus interface to the second bus interface during a data phase of the second transaction.

32. The computer system of claim 31, further comprising a third bus interface coupled to a third computer bus wherein the control switch is structured to selectively connect the first and second bus interfaces to the third bus interface.

33. The computer system of claim 31, further comprising:

third and fourth computer buses for implementing computer transactions; and third and fourth bus interfaces coupled to the third and fourth computer buses, respectively, wherein the control switch is structured to connect the first bus interface to the second bus interface while simultaneously connecting the first bus interface to a third bus interface coupled to a third computer bus.

34. The computer system of claim 33 wherein the control switch includes read and write pathways connecting the first bus interface to the second bus interface, the read pathway being structured to enable read data to be transmitted from the first bus interface to the second bus interface and the write pathway being separate from the read pathway and structured to enable write data to be transmitted from the second bus interface to the first bus interface.

35. The computer system of claim 33 wherein the second bus interface includes a target bus interface and a master bus interface, the target bus interface being structured to process transaction requests received from the second computer bus and the master bus interface being structured to process transaction requests directed to the second computer bus.

36. The computer system of claim 33, further comprising a third bus interface coupled to a cache, wherein the control switch includes a snoop selector and a snoop arbiter each connected to the first and second bus interfaces, the snoop arbiter being structured to arbitrate between snoop requests received from the first and second bus interfaces and cause the snoop selector to connect to the third bus interface whichever one of the first and second bus interfaces transmitted a snoop request that is selected by the snoop arbiter, the third bus interface snooping the cache based on the selected snoop request.

37. A computer system, comprising:

first, second, third, and fourth computer buses for implementing computer transactions;

first, second, third, and fourth bus interfaces coupled to the first, second, third, and fourth computer buses, respectively; and a control switch coupled to each of the bus interfaces, the control switch including a first pathway connecting the first bus interface to the second bus interface and a second pathway connecting the third bus interface to the fourth bus interface while the first bus interface is connected to the second bus interface by the first path, the control switch further comprising:

a first request phase selector structured to selectively connect the first bus interface to the second bus interface during a request phase of a first transaction;

a first data phase selector structured to selectively connect the first bus interface to the second bus interface during a data phase of the first transaction;

a second request phase selector structured to selectively connect the third bus interface to the fourth bus interface during a request phase of a second transaction;

a second data phase selector structured to selectively connect the third bus interface to the fourth bus interface during a data phase of the second transaction, a first request arbiter connected to the first request phase selector and to the first and third bus interfaces, the request arbiter being structured to arbitrate between transaction requests received from the first and third bus interfaces and cause the first request phase selector to connect to the second bus interface whichever one of the first and third bus interfaces transmitted a transaction request that is selected by the first request arbiter; and a second request arbiter connected to the second request phase selector and to the first and third bus interfaces, the request arbiter being structured to arbitrate between transaction requests received from the first and third bus interfaces and cause the second request phase selector to connect to the fourth bus interface whichever one of the first and third bus interfaces transmitted a transaction request that is selected by the second request arbiter.

38. The computer system of claim 37 wherein the control switch further includes first and second selectors connected to the second and fourth bus interfaces, respectively, the first selector being structured to selectively connect the first and third bus interfaces to the second bus interface and the second selector being structured to selectively connect the first and third bus interfaces to the fourth bus interface.

39. The computer system of claim 38 wherein the control switch further includes third and fourth selectors connected to the first and third bus interfaces, respectively, the third selector being structured to selectively connect the second and fourth bus interfaces to the first bus interface and the fourth selector being structured to selectively connect the second and fourth bus interfaces to the third bus interface.

40. The computer system of claim 37 wherein the first pathway of the control switch includes read and write pathways connecting the first bus interface to the second bus interface, the read pathway being structured to enable read data to be transmitted from the second bus interface to the first bus interface and the write pathway being separate from the read pathway and structured to enable write data to be transmitted from the first bus interface to the second bus interface.

41. The computer system of claim 37 wherein the first bus interface includes a target bus interface and a master bus interface, the target bus interface being structured to process transaction requests received from the first computer bus and the master bus interface being structured to process transaction requests directed to the first computer bus.

42. The computer system of claim 37 wherein the second bus interface is connected to a cache and the control switch includes a snoop selector and a snoop arbiter each connected to the first and third bus interfaces, the snoop arbiter being structured to arbitrate between snoop requests received from the first and third bus interfaces and cause the snoop selector to connect to the second bus interface whichever one of the first and third bus interfaces transmitted a snoop request that is selected by the snoop arbiter, the second bus interface snooping the cache based on the selected snoop request.

43. The computer system of claim 37 wherein the first computer bus is a computer processor, the second computer bus is a first expansion bus, the third computer bus is a second expansion bus, and the fourth computer bus is a system memory.

* * * * *

UNITED STATES PATENT AND TRADEMARK OFFICE
CERTIFICATE OF CORRECTION

PATENT NO. : 5,935,233
DATED : August 10, 1999
INVENTOR(S) : Jeddeloh

It is certified that error appears in the above-identified patent and that said Letters Patent is hereby corrected as shown below:

|  | Reads | Should Read |
|---|---|---|
| Column 1, line 38 | "faster " | - - faster, - - |
| Column 8, line 8 | "86A" | - - 86A, - - |

Title reads "Computer System With A Switch Interconnector For Computer Devices"

Title should read -- Computer System With A Switch Interconnection For Computer Devices --

Signed and Sealed this

Fifteenth Day of May, 2001

Attest:

NICHOLAS P. GODICI

Attesting Officer　　Acting Director of the United States Patent and Trademark Office